United States Patent
Han et al.

(12)

(10) Patent No.: US 10,666,639 B2
(45) Date of Patent: May 26, 2020

(54) CUSTOMER-CENTRIC WORKFLOW FOR INITIAL ON-BOARDING OF AN OPENFLOW ENABLED SWITCH

(71) Applicant: Avaya Inc., Basking Ridge, NJ (US)

(72) Inventors: Seung Bong Han, Tracy, CA (US); Wu Miao, North Andover, MA (US); Sanket Ravindra Tandulwadkar, Somerville, MA (US); Sunil Menon, Los Gatos, CA (US); Carl Keene, Groveland, MA (US)

(73) Assignee: Avaya, Inc., Santa Clara, CA (US)

( * ) Notice: Subject to any disclaimer, the term of this patent is extended or adjusted under 35 U.S.C. 154(b) by 105 days.

(21) Appl. No.: 15/597,239

(22) Filed: May 17, 2017

(65) Prior Publication Data

US 2017/0339144 A1    Nov. 23, 2017

Related U.S. Application Data

(60) Provisional application No. 62/339,250, filed on May 20, 2016.

(51) Int. Cl.
*H04L 29/06* (2006.01)
*H04L 9/32* (2006.01)
(Continued)

(52) U.S. Cl.
CPC ........ *H04L 63/0823* (2013.01); *H04L 9/3263* (2013.01); *H04L 9/3265* (2013.01);
(Continued)

(58) Field of Classification Search
CPC ..... H04L 49/70; H04L 45/38; H04L 63/0823; H04L 63/0876; H04L 9/3263; H04L 9/3265; H04L 9/3268
See application file for complete search history.

(56) References Cited

U.S. PATENT DOCUMENTS

| | | |
|---|---|---|
| 7,802,092 B1 | 9/2010 | Kelly et al. |
| 8,918,631 B1 | 12/2014 | Kumar et al. |
| | (Continued) | |

OTHER PUBLICATIONS

Watsen et al., "NETCONF Server and RESTCONF Server Configuration Models draft-ietf-netconf-server-model-09", NETCONF Working Group (Year: 2016).*
(Continued)

*Primary Examiner* — Jeremy S Duffield
(74) *Attorney, Agent, or Firm* — Stevens & Showalter LLP

(57) ABSTRACT

Authenticating a networking appliance attempting to attach to a network includes receiving at least one value associated with an identity of the networking appliance; receiving a certificate signing request (CSR) from the networking appliance, wherein the CSR comprises credential data associated with the identity of the networking appliance; and generating an appliance certificate based on the credential data and a certificate authority (CA) certificate associated with the computer. The method also includes returning the appliance certificate to the networking appliance; receiving a request from the networking appliance to attach to the network; and authenticating the identity of the networking appliance based on both a) the at least one value associated with the identity of the networking appliance; and b) the appliance certificate.

16 Claims, 17 Drawing Sheets

(51) Int. Cl.
*H04L 12/931* (2013.01)
*H04L 12/717* (2013.01)
*H04L 12/721* (2013.01)

(52) U.S. Cl.
CPC ............ *H04L 9/3268* (2013.01); *H04L 49/70* (2013.01); *H04L 63/0876* (2013.01); *H04L 45/38* (2013.01); *H04L 45/42* (2013.01)

(56) References Cited

U.S. PATENT DOCUMENTS

| | | | |
|---|---|---|---|
| 9,100,296 | B1 | 8/2015 | Kishore et al. |
| 2007/0005981 | A1* | 1/2007 | Miyazawa .......... H04L 63/0428 713/176 |
| 2008/0209216 | A1 | 8/2008 | Kelly et al. |
| 2009/0300743 | A1* | 12/2009 | Ma ..................... H04L 41/0213 726/6 |
| 2010/0037052 | A1 | 2/2010 | Brener et al. |
| 2010/0071040 | A1* | 3/2010 | Upp ........................ G06F 21/33 726/6 |
| 2010/0161969 | A1* | 6/2010 | Grebovich .............. H04L 9/321 713/156 |
| 2015/0049631 | A1 | 2/2015 | Heron et al. |
| 2015/0058634 | A1* | 2/2015 | Watsen .................... H04L 41/28 713/175 |
| 2015/0326543 | A1* | 11/2015 | Pochuev ............ H04L 63/0442 713/155 |
| 2015/0341342 | A1* | 11/2015 | Klieman ............ H04L 63/0823 713/158 |
| 2015/0365278 | A1 | 12/2015 | Chakrabarti et al. |
| 2016/0087955 | A1* | 3/2016 | Mohamad Abdul ...... G06F 8/60 726/7 |
| 2017/0289117 | A1* | 10/2017 | Powers ................. H04W 8/005 |
| 2017/0325094 | A1 | 11/2017 | Lee et al. |
| 2018/0091557 | A1 | 3/2018 | Komu et al. |
| 2018/0091621 | A1 | 3/2018 | Kuo et al. |

OTHER PUBLICATIONS

Related U.S. Appl. No. 15/597,211; entitled "Public Key Infrastructure Exchange Using Netconf for Openflow Enabled Switches;" filed May 17, 2017 by Seung Bong Han et al.

Related U.S. Appl. No. 15/597,220; entitled "Certificate-Based Dual Authentication for Openflow Enabled Switches;" filed May 17, 2017 by Seung Bong Han et al.

M. Pritikin et al.; "Bootstrapping Key Infrastructures, draft-ietf-anima-bootstrapping-keyinfra-02"; Internet draft document; Mar. 17, 2016.

K. Watsen et al.; Zero Touch Provisioning for Netconf or Restconf based Management, draft-ietf-netconf-zerotouch-08; Internet draft document; Apr. 6, 2016.

Sarker, Sanchit K.; Office Action, U.S. Appl. No. 15/597,211; dated Mar. 27, 2019; United States Patent and Trademark Office; Alexandria, VA.

Duffield, Jeremy S.; Office Action, U.S. Appl. No. 15/597,220; dated Feb. 27, 2019; United States Patent and Trademark Office; Alexandria, VA.

Duffield, Jeremy S.; Final Office Action, U.S. Appl. No. 15/597,220; dated Aug. 1, 2019; United States Patent and Trademark Office; Alexandria, VA.

Sarker, Sanchit K.; Final Office Action, U.S. Appl. No. 15/597,211; dated Oct. 11, 2019; United States Patent and Trademark Office; Alexandria, VA.

Duffield, Jeremy S.; Notice of Allowance; U.S. Appl. No. 15/597,220; dated Jan. 29, 2020; U.S. Patent and Trademark Office; Alexandria, Virginia.

Sarker, Sanchit K.; Advisory Action; U.S. Appl. No. 15/597,211; dated Feb. 21, 2020; U.S. Patent and Trademark Office; Alexandria, Virginia.

Duffield, Jeremy S.; Notice of Allowance; U.S. Appl. No. 15/597,211; dated Mar. 27, 2020; U.S. Patent and Trademark Office; Alexandria, Virginia.

* cited by examiner

```
module: ona100
  +--rw system
  |  +--ro status
  |  |  +--ro system-uptime
  |  |  |  +--ro days?                      time-days
  |  |  |  +--ro hours?                     time-hours
  |  |  |  +--ro minutes?                   time-minutes
  |  |  +--ro device-temperature?           temperature-celsius
  |  |  +--ro device-serial-number?         string
  |  |  +--ro device-model?                 enumeration
  |  |  +--ro software-version?             string
  |  |  +--ro cpu-utlization?               percent
  |  |  +--ro memory-utlization?            uint32
  |  +--ro download-image-status
  |  |  +--ro status?                       enumeration
  |  |  +--ro error-code?                   enumeration
  |  +--rw configuration
  |     +--rw ona-mode?                     enumeration
  |     +--rw apps-set-status?              enumeration
  |     +--rw temperature?                  uint32
  |     +--rw temperature-alarm?            temperature-alarm
  |     +--rw management-ip-address?        inet:ip-address
  |     +--rw management-subnet-mask?       inet:ip-address
  |     +--rw management-ip-gateway?        inet:ip-address
  |     +--rw dns-servers* [id]
  |     |  +--rw id                         uint8
  |     |  +--rw dns-server-ip-address?     inet:ip-address
  |     +--rw dhcp?                         boolean
  |     +--rw certificate-signing-request?  string
  |     +--rw switch-cert?                  string
  |     +--rw cacert?                       string
  +--rw bridge
     +--rw name?                            string
     +--rw controllers
     |  +--rw controller* [id]
     |     +--rw id                         uint8
     |     +--rw role?                      enumeration
     |     +--rw target-ip-address          inet:ip-address
     |     +--rw target-port?               inet:port-number
     |     +--rw protocol?                  enumeration
     |     +--ro state
     |        +--ro is-connected?           boolean
     |        +--ro connection-state?       enumeration
     |        +--ro connection-last-error?  string
     |        +--ro role?                   enumeration
     |        +--ro sec-since-connect?      uint32
     |        +--ro sec-since-disconnect?   uint32
     +--rw ports
        +--rw port* [id]
           +--rw id                         uint8
           +--rw name                       string
           +--rw interfaces
              +--rw interface* [id]
                 +--rw id                   uint16
                 +--rw name                 string
                 +--rw fa-lldp-enable?      boolean
```

```
<rpc xmlns="urn:ietf:params:xml:ns:netconf:base:1.0" message-id="">
  <edit-config>
    <target>
      <running/>
    </target>
    <config>
      <ona100:system xmlns:ona100="urn:avaya:params:xml:ns:yang:ona100">
        <ona100:configuration>
          <ona100:switch-cert>this is switch cert</ona100:switch-cert>
          <ona100:cacert>Ca Certificate</ona100:cacert>
        </ona100:configuration>
      </ona100:system>
    </config>
  </edit-config>
```

```
<?xml version="1.0" encoding="utf-8"?>
<rpc-reply xmlns="urn:ietf:params:xml:ns:netconf:base:1.0" message-id="4">
<ok/>
</rpc-reply>
```
1102

FIG. 11

```
<?xml version="1.0" encoding="utf-8"?>
<rpc-reply xmlns="urn:ietf:params:xml:ns:netconf:base:1.0" message-id="6">
  <rpc-error>
    <error-type>protocol</error-type>
    <error-tag>unknown-element</error-tag>
    <error-severity>error</error-severity>
    <error-path xmlns:ona100="urn:avaya:params:xml:ns:yang:ona100">
    /rpc/edit-config/config/ona100/system/ona100:configuration
    </error-path>
    <error-info>
      <bad-element>server-certificates</bad-element>
    </error-info>
  </rpc-error>
</rpc-reply>
```

```
<?xml version="1.0" encoding="utf-8"?>
<data xmlns="urn:ietf:params:xml:ns:netconf:base:1.0">
  <system xmlns="urn:avaya:params:xml:ns:yang:ona100">
    <configuration>
      <switch-cert>-----BEGIN CERTIFICATE-----
MIIEowIBAAKWy3QIDAQABAOIBAQCbPaEeFw1Rakt7
jNx+qpsSfiW8AfoU+vplzxLj4HsLif..................
-----END CERTIFICATE-----
      </switch-cert>           1402
    </configuration>
  </system>
</data>
```

FIG. 14

CUSTOMER-CENTRIC WORKFLOW FOR INITIAL ON-BOARDING OF AN OPENFLOW ENABLED SWITCH

BACKGROUND

The present disclosure relates generally to operation of a software defined networking (SDN) controller and, more particularly, to security features of an SDN controller.

In a computer network, network switching devices (switches) interconnect to form a path for transmitting information between an originator and a recipient. A routing mechanism, or protocol, defines switching logic that forwards the transmitted information in the form of packets between the switches as a series of "hops" along a path. At each switch, the switching logic identifies the next switch, or hop, in the path using an identifier such as a Media Access Control (MAC) address. Shortest Path Bridging (SPB) is a routing mechanism having switching logic such that each switch advertises the nodes it knows about to all the other switches, and eventually all the switches in the network have the same picture of the network and therefore can forward frames to the next hop along a shortest path.

In a conventional router or switch, the fast packet forwarding (data path) and the high level routing decisions (control path) occur on the same device. An OpenFlow Switch separates these two functions. The data path portion still resides on the switch, while high-level routing decisions are moved to a separate controller, typically a standard server. The OpenFlow Switch and Controller communicate via the OpenFlow protocol, which defines messages, such as packet-received, send-packet-out, modify-forwarding-table, and get-stats.

The data path of an OpenFlow Switch presents a clean flow table abstraction; each flow table entry contains a set of packet fields to match, and an action (such as send-out-port, modify-field, or drop). When an OpenFlow Switch receives a packet it has never seen before, for which it has no matching flow entries, it sends this packet to the controller. The controller then makes a decision on how to handle this packet. It can drop the packet, or it can add a flow entry directing the switch on how to forward similar packets in the future.

In simpler terms, OpenFlow allows the path of network packets through the network of switches to be determined by software running on multiple routers (minimum two of them—primary and secondary—has a role of observers). This separation of the control from the forwarding allows for more sophisticated traffic management than is feasible using access control lists (ACLs) and routing protocols.

The OpenFlow protocol can also be referred to as a software-defined networking (SDN) protocol. As alluded to above, an SDN protocol differs in at least one respect from a more traditional protocol in that the switching devices can be relatively low cost and so-called "dumb" switching devices that do not have much if any built-in routing logic. Instead, the switching devices are programmed and controlled by an external network fabric controller device over a programming path different than the data path and/or the control path of the network. The OpenFlow protocol is maintained by the Open Networking Foundation of Palo Alto, Calif., such that a corresponding network fabric controller device is referred to as an OpenFlow network controller. Switching and other network devices are likewise referred to as OpenFlow network devices.

A disadvantage of the OpenFlow protocol in particular is that any OpenFlow network device can join an OpenFlow network. This is problematic, because malicious such devices may easily join existing OpenFlow networks by communicating with the OpenFlow network controllers controlling these OpenFlow networks. The OpenFlow protocol provides little protection against untrusted OpenFlow network devices becoming part of an OpenFlow network.

BRIEF SUMMARY

One aspect of the present disclosure relates to a computer implemented method for authenticating a networking appliance attempting to attach to a network. The method includes receiving, by a computer attached to the network, at least one value associated with an identity of the networking appliance; receiving, by the computer, a certificate signing request (CSR) from the networking appliance, wherein the CSR comprises credential data associated with the identity of the networking appliance; and generating, by the computer, an appliance certificate based on the credential data and a certificate authority (CA) certificate associated with the computer. The method also includes returning, by the computer, the appliance certificate to the networking appliance; receiving, by the computer, a request from the networking appliance to attach to the network; and authenticating, by the computer, the identity of the networking appliance based on both a) the at least one value associated with the identity of the networking appliance; and b) the appliance certificate.

Another aspect of the present disclosure relates to a system for authenticating a networking appliance attempting to attach to a network that includes a memory device storing executable instructions; and a processor in communication with the memory device. In particular, executing the executable instructions by the processor causes the processor to: receive at least one value associated with an identity of the networking appliance; receive a certificate signing request (CSR) from the networking appliance, wherein the CSR comprises credential data associated with the identity of the networking appliance; and generate an appliance certificate based on the credential data and a certificate authority (CA) certificate associated with the computer. Executing the executable instructions by the processor also causes the processor to: return the appliance certificate to the networking appliance; receive a request from the networking appliance to attach to the network; and authenticate the identity of the networking appliance based on both a) the at least one value associated with the identity of the networking appliance; and b) the appliance certificate.

Embodiments of the present disclosure relate to the interaction between an open network adapter (ONA) and an SDN Controller. Specifically, the relevant interactions relate to when the ONA is first on-boarded onto the network fabric. The SDN Controller can use OpenDaylight to establish an OpenFlow-based communication with the ONA. Other aspects of the disclosure relate to how OpenDaylight can interface with a cluster of SDN controllers operating as a single, virtual controller.

One embodiment relates to a method of utilizing the netconf configuration interface to exchange the messages via a netconf session that occurs when the ONA first boots up. The YANG data model of the ONA is extended to include additional model elements of: "certificate-signing-request"; "switch-cert", and "cacert". The inclusion of these new elements allow additional RPC messages to be generated as part of the netconf conversation. The new messages allow:

a) the OpenDaylight component (ODL) to instruct the ONA to generate a Certificate Signing Request (CSR);

b) the ONA to deliver a CSR with the ONA public key and a portion signed by the ONA private key; and c) the OpenDaylight component to deliver the ONA their public key back which has been signed by the private key of the SDN Controller.

The details of this embodiment relate to a particular multistage protocol between the ONA, the SDN Controller, and the OpenDaylight component.

At the end of the exchange, the following improvements have been accomplished:

a) the ONA will have a unique private key;

b) that ONA private key will have never been outside the control of the ONA; and c) the ONA will have an identity certificate that has been signed by the SDN Controller.

A second embodiment can involve dual authentication of the ONA after the initial provisioning of the certificates discussed in the earlier embodiment. When the ONA has the needed certificate from the SDN Controller, then the ONA can participate in an authentication scheme with the OpenDaylight component that relies on a primary authentication method which is identity certificate verification. This embodiment relates to a particular protocol that begins with initiating a OpenFlow session over TLS which relies on the ONA providing a signed certificate which the OpenDaylight component (ODL) can then authenticate with the private key of the SDN Controller. The OpenFlow initiation can then complete once the certificate has been authenticated. Secondly, the ONA initiates a Netconf session over a secure shell tunnel by providing the signed certificate to the ODL component which can then be authenticated with the private key of the SDN Controller. The initiation of the Netconf session can then be completed once the certificate has been verified. Once that first stage of authentication has taken place, the OpenDaylight component and a management app can perform the steps to handle a ONA request to attach to the network and to authenticate that attach request event with the serial number of the ONA from a database. The ONA can then be activated. At this stage two communications paths are active between the ONA and the OpenDaylight component: an OpenFlow session over TLS and a Netconf session over SSH tunnel.

A third embodiment looks at the process at the system-wide level as involving a general 3-step workflow of how to on-board a new ONA onto the network by actions performed by a customer and not relying on installing PKI certificates on each ONA during the manufacturing process. The first step involves a physical step in which the MAC address and serial number of the ONA are captured, for example, by a QR reader and added to the databases maintained by the SDN Controller. The second step is a PKI generation and certificate exchange during the initial boot of the ONA when it has first been attached to the network. The public and private keys for the ONA are generated in such a way that each ONA will have a unique private key. As the initial boot process continues, the ONA and the SDN Controller exchange messages using an augmented version of netconf to provide the ONA public key to the SDN Controller. The SDN Controller acts as a certificate authority, signs the public key and returns the signed certificate to the ONA. As the final step in the 3-step process, the ONA can first authenticate an OpenFlow session and a Netconf session using the signed certificate. Upon successful verification using the signed certificate, the ONA can be authenticated by the OpenDaylight component using the ONA's serial number. At this stage, the ONA can be set as active and that status reflected in a management application used by the customer.

BRIEF DESCRIPTION OF THE DRAWINGS

So the manner in which the above recited features of the present disclosure can be understood in detail, a more particular description of embodiments of the present disclosure, briefly summarized above, may be had by reference to embodiments, which are illustrated in the appended drawings. It is to be noted, however, the appended drawings illustrate only typical embodiments encompassed within the scope of the present disclosure, and, therefore, are not to be considered limiting, for the present disclosure may admit to other equally effective embodiments.

FIG. 8 illustrates an example YANG tree of a network adapter in accordance with the principles of the present disclosure.

FIG. 9-FIG. 14 illustrate examples of netconf messages that facilitate an exchange of public key infrastructure (PKI) certificates in accordance with the principles of the present disclosure.

DETAILED DESCRIPTION

General Language Usage

Figure 1:
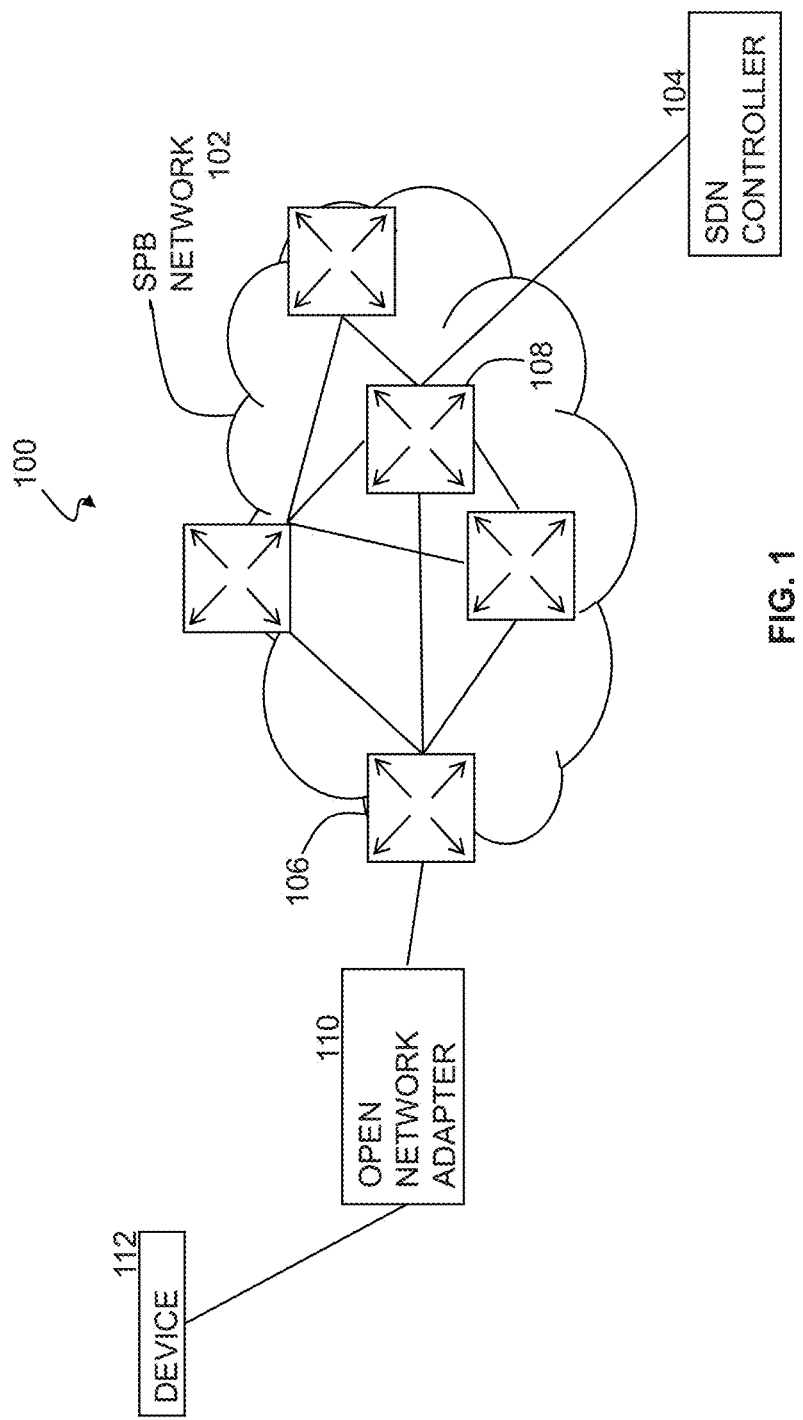
FIG. 1 illustrates an example network environment in which a device can be attached to an SDN network in accordance with the principles of the present disclosure.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

As used herein, the term "transmitter" may generally comprise any device, circuit, or apparatus capable of transmitting a signal. As used herein, the term "receiver" may generally comprise any device, circuit, or apparatus capable of receiving a signal. As used herein, the term "transceiver" may generally comprise any device, circuit, or apparatus capable of transmitting and receiving a signal. As used herein, the term "signal" may include one or more of an electrical signal, a radio signal, an optical signal, an acoustic signal, and so forth.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated those individual aspects of the present disclosure can be separately claimed.

Example Environment

FIG. 1 illustrates an example network environment in which a device can be attached to an SDN network in accordance with the principles of the present disclosure. To aid in the understanding of the present disclosure the example environment is described in the context of a healthcare provider environment. In particular, one example of an SDN controller 104 is an Avaya® SDN Fx Controller. Also, an example network adapter 110 that can attach to an edge switch 106 of a shortest path bridge (SPB) network 102 can include an Avaya® open network adapter (ONA). However, one of ordinary skill will readily recognize that those particular devices in the example healthcare environment are merely examples and the present disclosure is not limited to those specific examples.

The example environment 100 of FIG. 1 includes an ONA 110 which is an intelligent network appliance that is connected to a network-enabled device 112 (e.g., a medical telemetry device) on one side and connected to a network 102 on its other side. The network 102 can include a number of switches (e.g., 106, 108) that are coupled together to establish an SPB network. The ONA 110 can, for example, connect to an Ethernet port of a switch 106 exposed at the edge of the network 102.

The ONA 110 can be a smart network appliance such as a microcontroller, or microprocessor, based device that contains an operating system such as the Linux operating system with Open vSwitch. When programmed, the ONA 110 provides many intelligent functions to support a broad range of IoT-type devices (with an Ethernet port) that have traditionally been difficult to control on the edge of the network 102. As known to one of ordinary skill in this field of endeavor, Open vSwitch is a feature-rich open-source virtual switch that provides automated network service provisioning using Auto-Attach (IEEE draft 802.1Qcj) including a flexible range of traffic flow programming for forwarding, filtering, isolation, monitoring, queuing, shaping, and logging.

The SDN controller 104 provides the management of an SDN framework implemented within the SPB network 102. The SDN controller 104 may be a software application operating on any standards-based server and performs the following functions: a) assigns service profiles to ONA's; b) manages interfaces into SDN program environments; c) presents inventory lists of devices connected to the ONAs; and d) exposes northbound and southbound API's. The SDN controller 104 may, for example, perform these functions by utilizing an OpenDaylight multi-protocol controller that manages all the services modules within the SDN framework. Using open protocols of NETCONF and OpenFlow for network configuration, manager/services modules can be accessed via a programmable northbound or southbound API layer.

The SPB network 102 can be an Ethernet fabric technology based on IEEE 802.1aq Shortest Path Bridging (MAC) network that dramatically simplifies network infrastructures by using just one protocol to deliver virtualized network services (network segments) across an entire enterprise. An example of such network technology is Avaya Fabric Connect®. One of the key benefits of this technology is simplified operations through fabric edge-layer-only provisioning, where the fabric core becomes a "Zero-touch-core" that virtually eliminates the chance of network misconfiguration. Another key benefit of Fabric Connect® is true service segmentation of virtualized Layer 2 or Layer 3 services. This functionality enables the fabric to easily create and manage virtual service networks segments that are invisible to IP scanning techniques. This is possible because Fabric Connect® does not use the IP protocol as a utility to establish service paths. This is referred to by Avaya as Stealth Network Services. This virtualized framework can also be leveraged to provide secure separation in multi-tenant environments.

The virtualized framework of the SPB network 102 can also implement technology known as Avaya Fabric Attach®. Also known as Auto-Attach (IEEE Draft 802.1Qcj), Avaya Fabric Attach® creates plug-n-play on-boarding for network elements that do not natively run Fabric Connect®. Fabric Attach extends Fabric Connect to deliver an "Autonomic Edge" capability that dramatically reduces the time and cost of adding new or modifying existing services. Any Fabric Attach capable device (such as an Ethernet switch, WLAN Access Point, or OVS based device—ONA 110) can be connected in a more secure fashion to the network, authorized, and request dynamic attachment to a new or existing network service instance. The ONA 110 can leverage Fabric Attach within Open vSwitch to request automatic provisioning attachment to services (network segments). Thus, the environment depicted in FIG. 1 can use this feature to fully automate network configuration and attachment without the need to touch any network element.

In an example healthcare environment, a new medical device 112 can arrive at the healthcare organization. Using a smartphone application, for example, some IT personnel can scan a bar code of the medical device 112 that identifies the medical device's serial number and MAC address. This information can then be recorded by the application into the healthcare organization's database. Next, the ONA 110 can include a quick-response (QR) code such that an ONA QR code is scanned and information uploaded to a management application database for pairing with the medical device 112. The information encoded in the QR code can include the ONA's MAC address, serial number, additional MAC addresses available to assign to the ONA, and similar data. For example, a model number could be included to assist with automatic determination of the capabilities and technical specifications of the ONA 110. Ultimately, network service information and communication rules for the medical device 112 connected to the ONA 110 are configured in the management application and the device 112 is ready for deployment.

The medical device 112 and ONA 110 are delivered to their intended location. The ONA 110 may, for example, remain co-located with the paired medical device 112 unless it needs to be reassigned to another device. The medical device Ethernet cable is plugged into the ONA device port and the ONA network port is plugged into an Ethernet switch port (e.g., switch 106). When fully booted, the ONA 110 signals the SDN Controller 104 which sends network service, profile, and security rule information back to the ONA 110. If, for example, the network infrastructure is Avaya Fabric Connect running Fabric Attach at the edge, the ONA 110 signals the network to provision and connect it to its isolated network segment. The medical device 112 is now able to communicate through the paired ONA 110 into a specifically assigned network segment.

If the medical device 112 needs to be physically moved to a new location, the Ethernet cable on the ONA network port is disconnected from the switch 106, and the ONA 110 is relocated with the medical device to the new location. Upon plugging the ONA 110 with its paired medical device 112 into, for example, an Ethernet wall-jack at the new location to reconnect with the switch 106 (or some other switch of the network 102), the ONA 110 signals the SDN controller 104 to get its profile. The SDN Controller 104 sends network service, profile and security rule information back to the ONA 110 as per the deployment process. All services and rules are re-established, now at the new location. As the medical devices with their paired ONA's are moved to different locations, the management application follows the ONA and medical device and registers the device status accordingly. All registered medical devices can be presented as an inventory list on the management application.

As described above, the ONA 110 appears as a controllable switch to the SDN controller 104. In general, the ONA 110 provides a field-deployable implementation of Open vSwitch, facilitating network connectivity and automating provisioning. Open vSwitch (OVS) is a virtual networking platform that delivers a software-definable solution for traffic forwarding, isolation and filtering, monitoring and traffic mirroring, queuing and shaping, and automating control. The vSwitch can be considered as the networking side of a Hypervisor implementation: Virtual Machines are provided with virtualized access to CPU, memory, disk, and also—via the vSwitch—to internal and external networks.

Using an Open vSwitch for the ONA 110, and utilizing OpenFlow in the SDN controller 104, are provided merely by way of example and one of ordinary skill would recognize other functionally equivalent appliances and protocols can be used without departing from the scope of the present disclosure. The ONA 110 can include a hypervisor in which a number of virtual switches operate. Open vSwitch is targeted at multi-server virtualization deployments. These environments are often characterized by highly dynamic end-points, the maintenance of logical abstractions, and sometimes integration with or offloading to special purpose switching hardware. Open vSwitch has support for both configuring and migrating both slow (configuration) and fast network state between instances. For example, if a virtual machine (VM) migrates between end-hosts, it is possible to not only migrate associated configuration (SPAN rules, ACLs, QoS) but any live network state (including, for example, existing state which may be difficult to reconstruct). Further, Open vSwitch state is typed and backed by a real data-model allowing for the development of structured automation systems.

Open vSwitch's forwarding path (the in-kernel datapath) is designed to be amenable to "offloading" packet processing to hardware chipsets, whether housed in a classic hardware switch chassis or in an end-host NIC. This allows for the Open vSwitch control path to be able to both control a pure software implementation or a hardware switch. An advantage of hardware integration is not only performance within virtualized environments. If physical switches also expose the Open vSwitch control abstractions, both bare-metal and virtualized hosting environments can be managed using the same mechanism for automated network control. In many ways, Open vSwitch targets a different point in the design space than previous hypervisor networking stacks, focusing on the need for automated and dynamic network control in large-scale Linux-based virtualization environments.

In particular, Open vSwitch supports OpenFlow as a method of exporting remote access to control traffic. There are a number of uses for this including global network discovery through inspection of discovery or link-state traffic (e.g., LLDP). Open vSwitch includes multiple methods for specifying and maintaining tagging rules, all of which are accessible to a remote process for orchestration. This allows, for example, thousands of tagging or address remapping rules to be configured, changed, and migrated.

OpenFlow is a protocol that allows a server to tell network switches where to send packets. In a conventional network, each switch has proprietary software that tells it what to do. With OpenFlow, the packet-moving decisions are centralized, so that the network can be programmed independently of the individual switches and data center gear. In a conventional switch, packet forwarding (the data path) and high-level routing (the control path) occur on the same device. An OpenFlow switch separates the data path from the control path. The data path portion resides on the switch itself; a separate controller makes high-level routing decisions.

OpenFlow enables network controllers to determine the path of network packets across a network of switches. The controllers are distinct from the switches. This separation of the control from the forwarding allows for more sophisticated traffic management than is feasible using access control lists (ACLs) and routing protocols. Also, OpenFlow allows switches from different vendors—often each with their own proprietary interfaces and scripting languages—to be managed remotely using a single, open protocol. OpenFlow allows remote administration of a layer 3 switch's packet forwarding tables, by adding, modifying and removing packet matching rules and actions. This way, routing decisions can be made periodically or ad hoc by the controller and translated into rules and actions with a configurable lifespan, which are then deployed to a switch's flow table, leaving the actual forwarding of matched packets to the switch at wire speed for the duration of those rules. Packets which are unmatched by the switch can be forwarded to the controller. The controller can then decide to modify existing flow table rules on one or more switches or to deploy new rules, to prevent a structural flow of traffic between switch and controller. It could even decide to forward the traffic itself, provided that it has told the switch to forward entire packets instead of just their header. The OpenFlow protocol is layered on top of the Transmission Control Protocol (TCP), and prescribes the use of Transport Layer Security (TLS). Controllers should listen on TCP port 6653 for switches that want to set up a connection.

Figure 2:
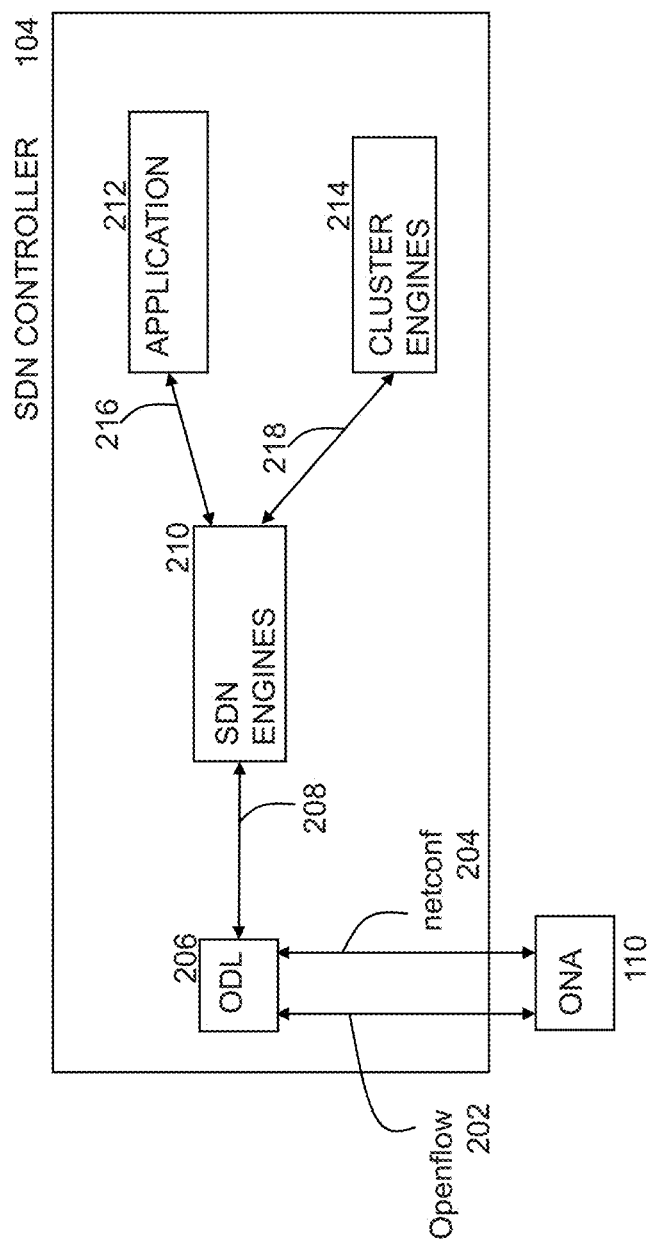
FIG. 2 illustrates a block-level view of an SDN controller and a network adapter in accordance with the principles of the present disclosure.

FIG. 2 illustrates a block-level view of an SDN controller and a network adapter in accordance with the principles of the present disclosure. Within the environment 100 described with respect to FIG. 1, this figure depicts the major software components involved in the present disclosure: ONA 110, ODL component 206, SDN Engines 210, a management application 212, and Cluster (or Clustering) Engines 214. As described in detail below, due to the nature of ONA 110 interaction with ODL 206, ONA will utilize a client/server certificate which was signed by the SDN Engines 210 to secure the OpenFlow-over-TLS channel and Netconf-over-SSH tunnel. The certificate can be used for encrypting both communication channels but verification of the certificate before the key negotiation is accomplished. Although not discussed in detail, separate certificates could be generated and exchanged for each of the SSH and the TLS sessions, respectively. Each certificate would be generated using a method similar to that discussed herein and then would be stored in an appropriate keystore location. The SDN Engines 210 is where a private CA (Certificate Authority) will be hosted and issuing the certificate to the ONAs during the ONA onboarding process. The Clustering Engines 214 are the database replication service components for the private CA in the SDN Engines 210. ODL 206 is the "gateway" software component for this process which speaks 'netconf' 204 and OpenFlow 202 as south-bound APIs to the ONA 110 and providing a RESTful API 208 as a north-bound API to the SDN Engines 210 to orchestrate the below-described public key infrastructure (PKI) process. The SDN engines 210 have respective communication paths 216, 218 with the management application 212 and the cluster engines 214.

One of ordinary skill will recognize that alternatives to PKI, netconf and ODL can be utilized without departing from the scope of the present disclosure. Also, as these protocols, techniques and standards are well-known, only a brief description of each is provided below. However, it is intended that in accordance with the principles of the present disclosure, utilization of the full feature set of these conventional technologies is available.

PKI and Certificate Signing Request

A public key infrastructure (PKI) is a set of roles, policies, and procedures needed to create, manage, distribute, use, store, and revoke digital certificates and manage public-key encryption. The purpose of a PKI is to facilitate the secure electronic transfer of information for a range of network activities. It is used for activities where simple passwords are an inadequate authentication method and more rigorous proof is required to confirm the identity of the parties involved in the communication and to validate the information being transferred.

In cryptography, a PKI is an arrangement that binds public keys with respective identities of entities (like persons and organizations). The binding is established through a process of registration and issuance of certificates at and by a certificate authority (CA). Depending on the assurance level of the binding, this may be carried out by an automated process or under human supervision.

In public key infrastructure (PKI) systems, a certificate signing request (also CSR or certification request) is a message sent from an applicant to a certificate authority in order to apply for a digital identity certificate. Before creating a CSR, the applicant first generates a key pair, keeping the private key secret. The CSR contains information identifying the applicant (such as a distinguished name in the case of an X.509 certificate) which must be signed using the applicant's private key. The CSR also contains the public key chosen by the applicant. The CSR may be accompanied by other credentials or proofs of identity required by the certificate authority, and the certificate authority may contact the applicant for further information. The three main parts that a certification request consists of are the certification request information, a signature algorithm identifier, and a digital signature on the certification request information. The first part contains the significant information, including the public key. The signature by the requester prevents an entity from requesting a bogus certificate of someone else's public key. Thus the private key is needed to produce, but it is not part of, the CSR.

NETCONF and YANG

The NETCONF protocol [RFC6241] is an XML-based protocol used to manage the configuration of networking equipment. NETCONF is defined to be session-layer and transport independent, allowing mappings to be defined for multiple session-layer or transport protocols. NETCONF can be used within a Secure Shell (SSH) session, using the SSH connection protocol [RFC4254] over the SSH transport protocol [RFC4253]. This mapping will allow NETCONF to be executed from a secure shell session by a user or application.

Although this document gives specific examples of how NETCONF messages are sent over an SSH connection, use of this transport is not restricted to the messages shown in the examples below. This transport can be used for any NETCONF message.

To run NETCONF over SSH, the client will first establish an SSH transport connection using the SSH transport protocol, and the client and server will exchange keys for message integrity and encryption. The client will then invoke the "ssh-userauth" service to authenticate the user, as described in the SSH authentication protocol [RFC4252]. Once the user has been successfully authenticated, the client will invoke the "ssh-connection" service, also known as the SSH connection protocol.

After the ssh-connection service is established, the client will open a channel of type "session", which will result in an SSH session. Once the SSH session has been established, the user (or application) will invoke NETCONF as an SSH subsystem called "netconf". Subsystem support is a feature of SSH version 2 (SSHv2) and is not included in SSHv1. Running NETCONF as an SSH subsystem avoids the need for the script to recognize shell prompts or skip over extraneous information, such as a system message that is sent at shell start-up.

However, even when a subsystem is used, some extraneous messages may be printed by the user's start-up scripts. In order to allow NETCONF traffic to be easily identified and filtered by firewalls and other network devices, NETCONF servers default to providing access to the "netconf" SSH subsystem only when the SSH session is established using the IANA-assigned TCP port <830>. But, servers may also be configurable to allow access to the netconf SSH subsystem over other ports.

A user (or application) could use the following command line to invoke NETCONF as an SSH subsystem on the IANA-assigned port:

[user@client]$ ssh-s server.example.org-p<830>netconf

A NETCONF over SSH session consists of the manager and agent exchanging complete XML documents. Once the session has been established and capabilities have been exchanged, the manager will send complete XML documents containing <rpc> elements to the server, and the agent will respond with complete XML documents containing <rpc-reply> elements.

The base protocol defines the following protocol operations:

| Operation | Description |
| --- | --- |
| <get> | Retrieve running configuration and device state information |
| <get-config> | Retrieve all or part of a specified configuration datastore |
| <edit-config> | Edit a configuration datastore by creating, deleting, merging or replacing content |
| <copy-config> | Copy an entire configuration datastore to another configuration datastore |
| <delete-config> | Delete a configuration datastore |
| <lock> | Lock an entire configuration datastore of a device |
| <unlock> | Release a configuration datastore lock previously obtained with the <lock> operation |
| <close-session> | Request graceful termination of a NETCONF session |
| <kill-session> | Force the termination of a NETCONF session |

Basic NETCONF functionality can be extended by the definition of NETCONF capabilities. The set of additional protocol features that an implementation supports is communicated between the server and the client during the capability exchange portion of session setup. Mandatory protocol features are not included in the capability exchange since they are assumed. RFC 4741 defines a number of optional capabilities including :xpath and :validate.

A capability to support subscribing and receiving asynchronous event notifications is published in RFC 5277. This document defines the <create-subscription> operation, which enables creating real-time and replay subscriptions. Notifications are then sent asynchronously using the <notification> construct. It also defines the interleave capability, which when supported with the basic :notification capability facilitates the processing of other NETCONF operations while the subscription is active.

A capability to support partial locking of the running configuration is defined in RFC 5717. This allows multiple sessions to edit non-overlapping sub-trees within the running configuration. Without this capability, the only lock available is for the entire configuration.

A capability to monitor the NETCONF protocol is defined in RFC 6022. This document contains a data model including information about NETCONF datastores, sessions, locks, and statistics that facilitates the management of a NETCONF server. It also defines methods for NETCONF clients to discover data models supported by a NETCONF server and defines the <get-schema> operation to retrieve them.

The NETCONF messages layer provides a simple, transport-independent framing mechanism for encoding a) RPC invocations (<rpc> messages), b) RPC results (<rpc-reply> messages), and c) event notifications (<notification> messages). Every NETCONF message is a well-formed XML document. An RPC result is linked to an RPC invocation by a message-id attribute. NETCONF messages can be pipelined, i.e., a client can invoke multiple RPCs without having to wait for RPC result messages first. RPC messages are defined in RFC 6241 and notification messages are defined in RFC 5277.

In the present disclosure, the ONA 110 can use NETCONF as its config data center and also as its management interface. For example, the ONA 110 can use tail-f's implementation of confd as a NETCONF server and to handle configuration and monitoring requests from internal and external NETCONF clients such as ODL 206. Tail-f's ConfD is a device configuration toolkit meant to be integrated as a management sub-system in network devices, providing a) an implementation of the NETCONF protocol, b) automatic rendering of northbound interfaces, including CLI, Web UI and NETCONF, c) clustered/fault-tolerant storage of configuration data, and d) master-agent/sub-agent framework for NETCONF, CLI, Web UI and SNMP. In particular, ConfD executes as a regular UNIX daemon on the target device, acting as: a) a NETCONF agent for the NETCONF protocol, b) a Web server for the Web UI, c) a CLI engine for command-line access, and d) as an SNMP agent. It also contains a built-in XML configuration database.

"YANG" is a data modeling language for the NETCONF network configuration protocol. The name is an acronym for "Yet Another Next Generation". The YANG data modeling language was developed by the NETMOD working group in the Internet Engineering Task Force (IETF) and was published as RFC 6020 in October 2010. The data modeling language can be used to model both configuration data as well as state data of network elements. Furthermore, YANG can be used to define the format of event notifications emitted by network elements and it allows data modelers to define the signature of remote procedure calls that can be invoked on network elements via the NETCONF protocol.

YANG is a modular language representing data structures in an XML tree format. The data modeling language comes with a number of built-in data types. Additional application specific data types can be derived from the built-in data types. More complex reusable data structures can be represented as groupings. YANG data models can use XPATH expressions to define constraints on the elements of a YANG data model.

Returning to FIG. 2, the software executing on the ONA 110 may utilize stable open source software wherever appropriate such as, for example, Netconf Confd as data central and Open vSwitch as a datapath flow control. The software can run as a pure software application on Linux or as an embedded hardware switch controller in a physical switch. In general, the software provides layer 2 and layer 3 networking protocol support with or without a separate network controller like Open Daylight (ODL).

Figure 3A:
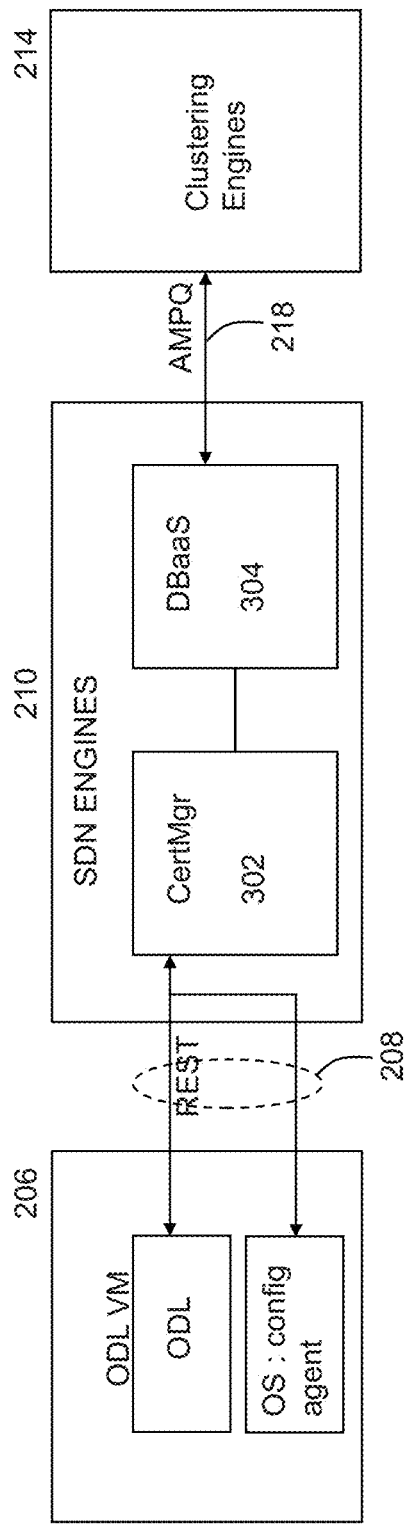
FIG. 3A and FIG. 3B illustrate a more detailed view of functional blocks of the SDN controller of FIG. 2.
Figure 3B:
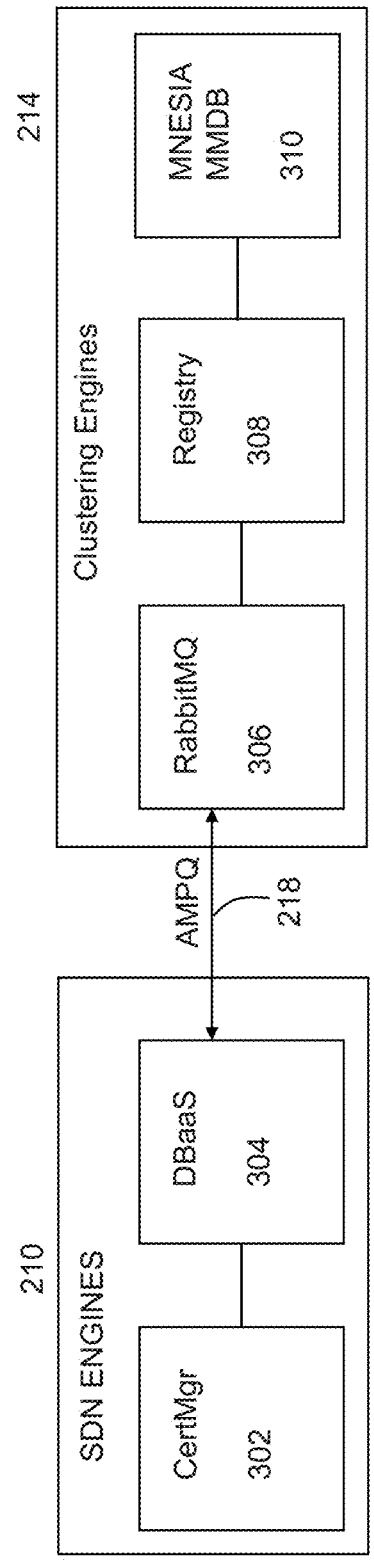

FIG. 3A and FIG. 3B illustrate a more detailed view of functional blocks of the SDN controller of FIG. 2. FIG. 3A provides details about the SDN Engines 210. For example, the SDN Engines 210 include a CertMgr 302 which is a software component that will play a role as a private CA in the controller 104. CertMgr 302 will communicate with ODL 206 to initiate the CSR request and push down the signed client/server certificate back to ONA 110 through an ODL REST API call. All the artifacts which are used to generate the signed certificate can be stored in database through a DBaaS component 304. There is also a software component in the ODL OS platform which will configure the ODL 206 to use the CA certificate during the TLS key negotiation. In particular, "OS:config agent" will receive the CA certificate which is generated by CertMgr and be able to configure the ODL 206 to use the certificate to verify the client/server certificate from the ONA 110.

FIG. 3B provides further details about the clustering engines 214. MNESIA MMDB 310 is the distributed Main Memory Database which stores all certificate information and is replicated to other cluster members. Registry 308 is the overlay to the MNESIA MMDB 310 to provide high level abstraction of the DBMS and also provide subscription and notification service. RabbitMQ 306 is an AMQP implementation in Erlang/OTP that can be used for seamless and high performing integration with SDN Engines 210 which is written in Java.

Figure 4:
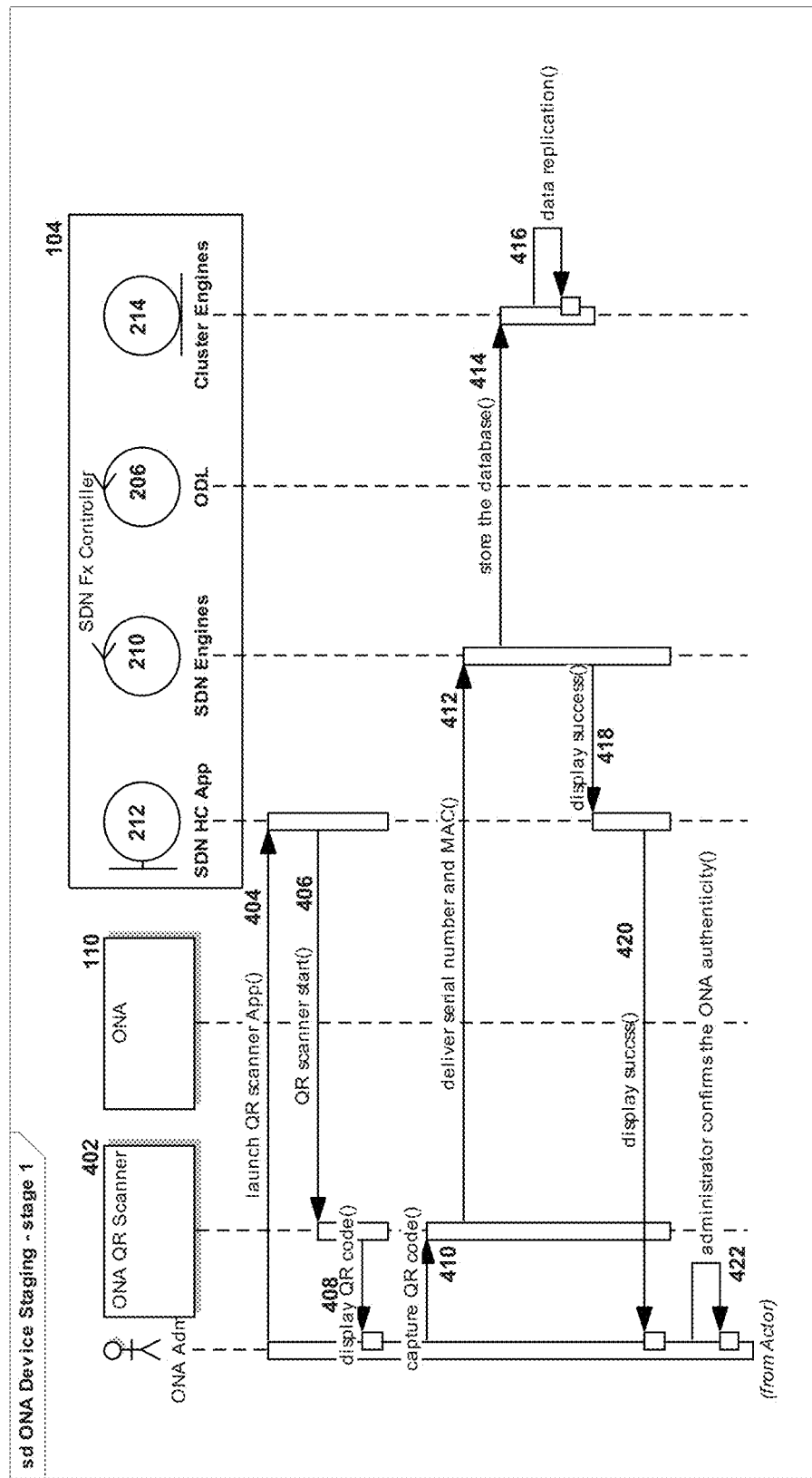
FIG. 4 illustrates a protocol diagram of one stage of attaching a device to a SDN controller in accordance with the principles of the present disclosure.

FIG. 4 illustrates a protocol diagram of one stage of attaching a device to a SDN controller 104 in accordance with the principles of the present disclosure. In accordance with FIG. 4, an administrative, or IT, member has a QR scanner 402 available. The QR scanner 402 can connect to the management application 212 of the SDN controller 104. The IT member launches a scanner app, in step 404, and begins a scan operation in step 406 as instructed by the app 212. A QR code that is displayed (step 408) on the ONA 110 is captured in step 410 and delivered, in step 412, to the SDN Engines 210. The QR code can encode the MAC address and the serial number of the ONA 110. The SDN Engines 210 stores, in step 414, the information in the database of the cluster engines 214. The stored information can be replicated, as well, by the cluster engines 214 in step 416. In step 418, the SDN engines 210 informs the management application 212 of a successful scan and store which, in turn, informs the IT member of the success in step 420. The IT member can then confirm, in step 422, the information in the "success" message with the physical ONA device 110.

As described in detail below, once the ONA 110 is cataloged with the SDN engines 210, it can be deployed within an enterprise such as the example healthcare environment described earlier. Once deployed (e.g., paired with a medical device 112), the ONA 110 will perform an initial boot-up procedure to generate a PKI certificate for further use.

Figure 5A:
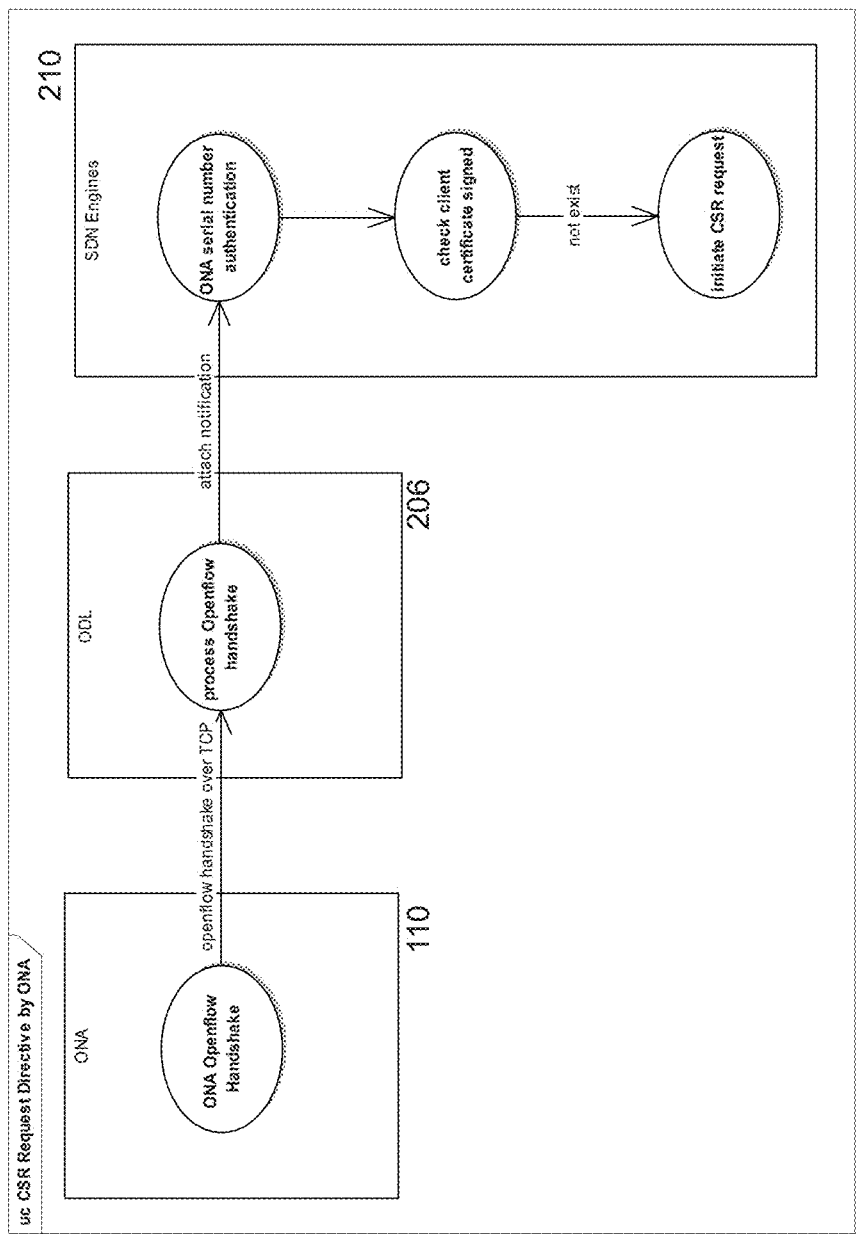
FIG. 5A and FIG. 5B illustrate alternative techniques for initiating a certificate signing request (CSR) in accordance with the principles of the present disclosure.
Figure 5B:
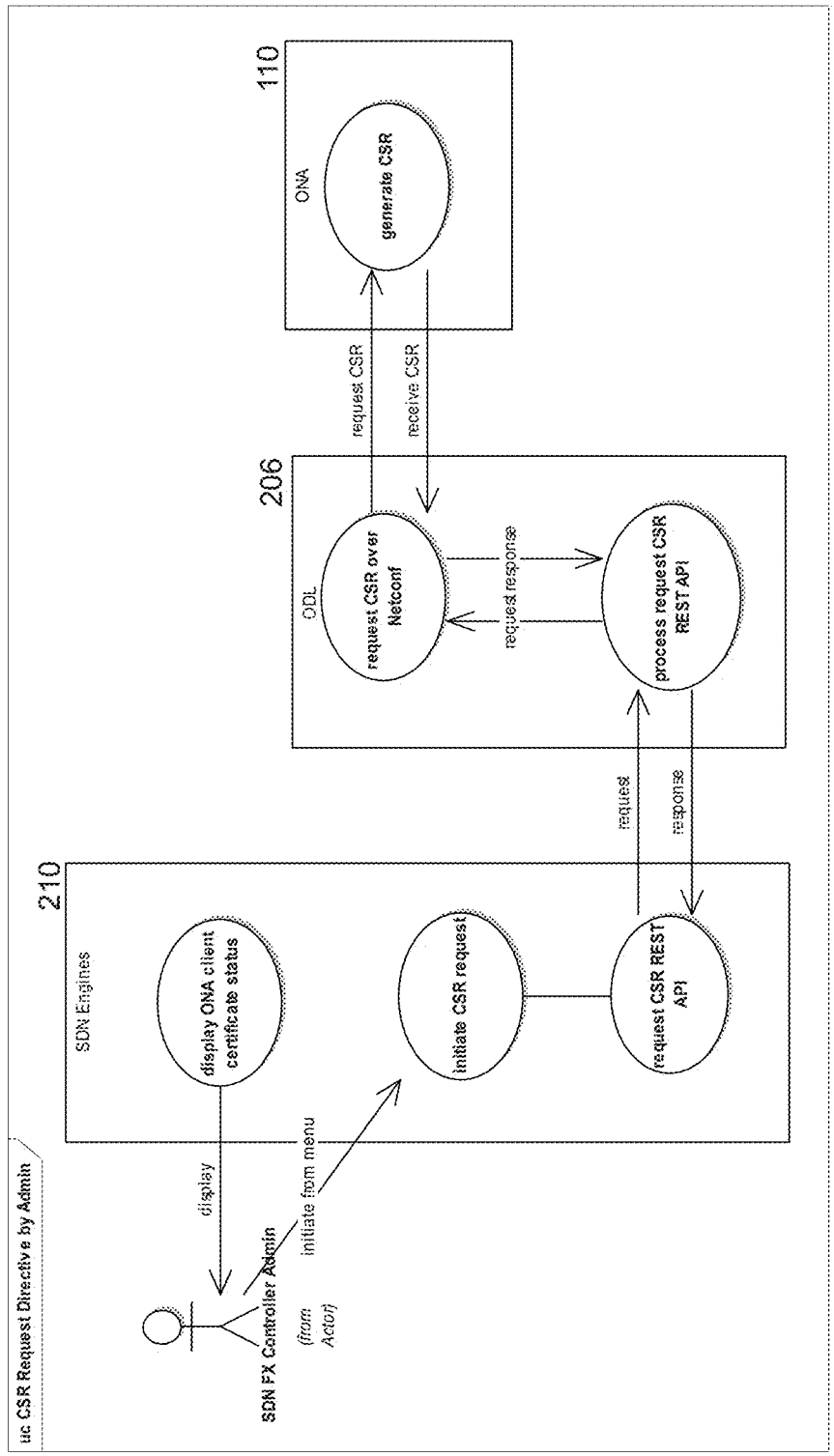

FIG. 5A and FIG. 5B illustrate alternative techniques for initiating a certificate signing request (CSR) in accordance with the principles of the present disclosure. In FIG. 5A, the ONA 110 initiates an Openflow handshake over TCP with the ODL component 206. The ODL component 206 then generates an "attach notification" event which it sends to the SDN engines 210. The notification allows the SDN engines 210 to start a process to authenticate the serial number of the ONA 110. Initially, the SDN engines 210 checks to determine if a signed client certificate for the ONA 110 exists. If the certificate does not exist, the SDN engines starts a process to initiate a CSR request.

In the alternative of FIG. 5B, the ONA 110 can be controlled by an IT member, through the SDN engines 210 to generate a CSR. Using the management application 212, for example, the IT member can display the certificate status for an ONA and initiate a CSR request using the REST API 208 to communicate with the ODL component 206. The ODL component 206 instructs the ONA 110 to generate a CSR by sending an appropriate NETCONF message. The ODL 206 receives the generated CSR via NETCONF and provides it to the SDN engines 210. Thus, it is possible to initiate the CSR request through the SDN controller's WebUI. This use case can be started even if the ONA 110 is already provisioned with a client certificate. The IT member can override the existing status and start the CSR request process. On receiving of a CSR request from the SDN Engines 210, the ONA 110 can regenerate the CSR request and overwrite the existing client certificate when it is successfully delivered.

Figure 6:
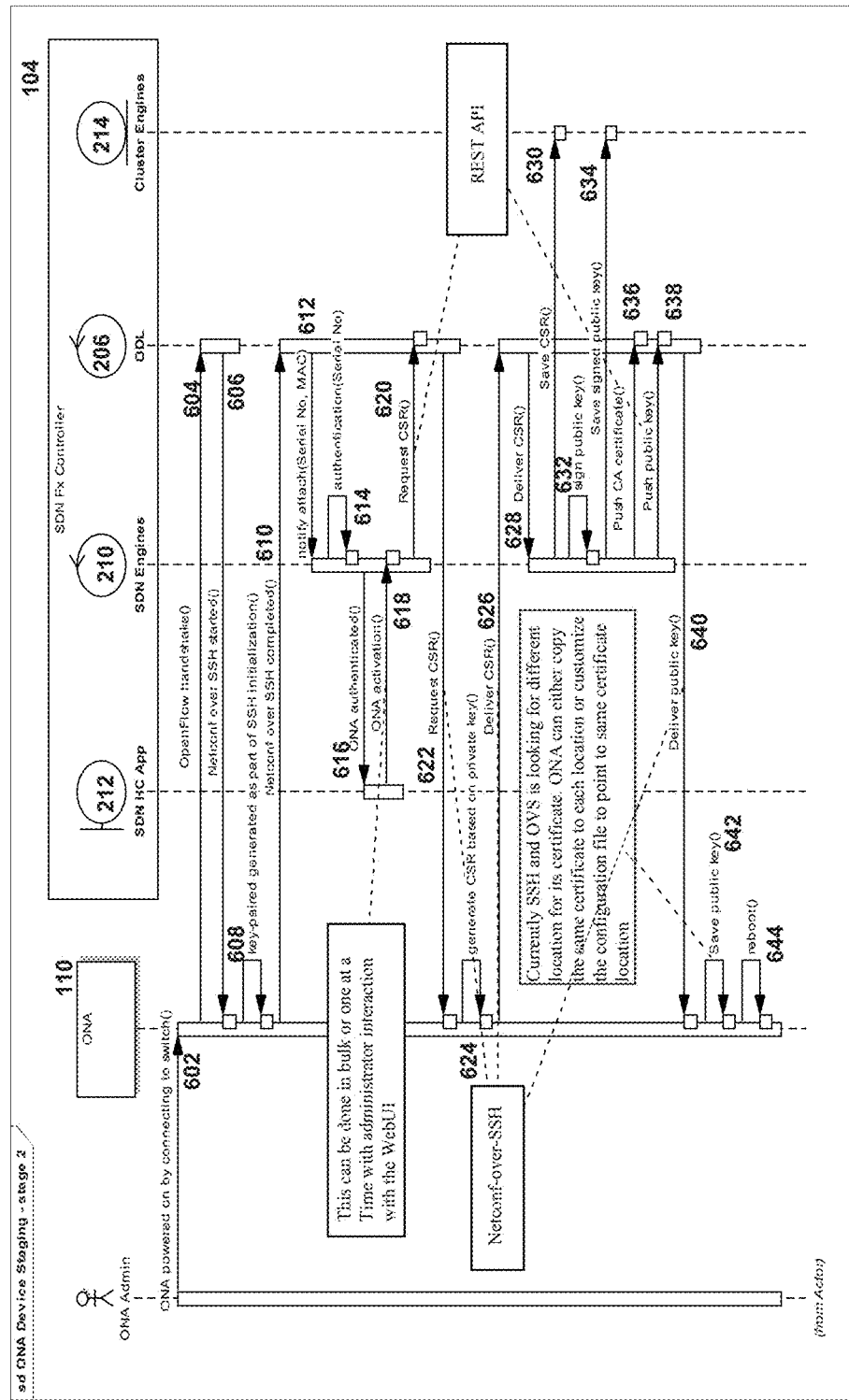
FIG. 6 illustrates a protocol diagram of a second stage of attaching the device to the SDN controller in accordance with the principles of the present disclosure.

FIG. 6 illustrates a protocol diagram of a second stage of attaching the device to the SDN controller 104 in accordance with the principles of the present disclosure. The protocol diagram of FIG. 6 aligns with the process described with respect to FIG. 5A and provides additional details. As a general overview, the process of FIG. 6 is initiated by the ONA 110 when it boots up. When the ONA 110 and the ODL 206 attempt the first serial number based authentication, the SDN Engines 210 checks whether a client certificate was previously issued or not for the ONA 110. If the ONA 110 has not been issued a client certificate, then a configuration manager portion of the SDN engines 210 can initiate the CSR request process through a CertMgr REST API call to the ODL 206.

In accordance with FIG. 6, there is no administrator intervention in this auto CSR signing process. The ONA 110 generates the key-pair during the very first boot. When the initial Openflow connection is made for the first time, the SDN Engines 210 will check the ONA information in the device inventory and check to see if an ONA client certificate has been signed or not. If it was not, then the SDN Engines 210 initiates the CSR request to the ONA 110 through the REST API 208 provided by the ODL 206. On receiving of the CSR Request in the ODL 206, the ODL 206 initiates the NETCONF communication to the ONA 110 to start a CSR request. In response, the ONA 110 will return a CSR to the ODL 206. The CSR will be transferred back to SDN Engines CertMgr. The CertMgr will process the CSR and sign the CSR. The SDN engines 210 returns the client certificate back to the ONA 110 through the ODL REST API. Once the client certificate is delivered to the ONA 110, the ONA 110 saves it in permanent storage. In addition, the SDN Engines CertMgr will transfer the CA cert to the ODL 206 which will be used to verify the client certificate later on to be placed in an ODL key store.

For the certificate authentication support described herein, new elements are added into ONA YANG data model. One example new element—CSR is added in ONA YANG model as a configuration data which can be queried by using the NETCONF get command with xpath filters. In particular, FIG. 8 depicts a partial YANG tree 800 for the ONA 110. The tree 800 has three added elements 802, 804 and 806 that relate to the principles of the present disclosure. The certificate which the ONA can use in an authentication process is element 804. The public key of the SDN engines 210 is element 806 and may be used by the ONA 110 for sending messages that can only be unencrypted by using the SDN engines' private key. The CSR-related element is element 802. These elements are defined in the ONA YANG data model as configuration data under <system>. Thus, these elements can be set by using NETCONF edit-config command. The values can also be accessed by get-config or get commands with an xpath filter.

The steps 602-618, other than step 608, relate to standard steps of connecting an ONA 110 with the SDN controller 104. In step 608, the ONA 110 generates a key pair as part of its initialization of the SSH connection.

Additionally, when the SDN engines 210 receive the ONA activation request of step 618, the SDN engines 210 can check whether the ONA 110 already has a signed certificate associated with its serial number. Steps 620-644 assume that the ONA 110 has no certificate yet.

In step 620 the SDN engines 210 instructs the ODL component 206 to request a CSR from the ONA 110. The ODL component 206, in step 622, instructs the ONA 110 to generate a CSR. This causes the ONA 110 to generate, in step 624, a CSR which includes the portion signed by the private key of the ONA 110 and to return the CSR, in step 626, to the ODL component 206. The CSR is delivered to the SDN engines 210, in step 628, so that it can be saved in the cluster engines, in step 630. The SDN engines 210 then uses the private key of the SDN controller to sign the public key of the ONA 110, in step 632. The signed public key is now a credential, or certificate, that is tied to the ONA 110 and, as such, it is saved in the cluster engines 214, in step 634. The SDN controller's public key (referred to in step 636 as the "CA certificate") along with the signed public key are pushed from the SDN engines 210 to the ODL component 206, in steps 636 and 638, respectively. The ODL component 206 delivers, in step 640, the signed public key to the ONA 110 which can then save it (step 642) and reboot (step 644).

Figure 9:
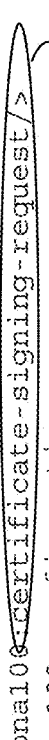

As shown in FIG. 6, steps 622, 626, 640 and 642 occur using NETCONF. FIG. 9 shows a NETCONF message which the ODL component 206 can send to the ONA 110 to instruct the ONA 110 to generate a CSR. Upon receiving the message 902, the ONA 110 will generate a CSR and return it to the ODL component 206 in a NETCONF reply message. FIG. 10 illustrates a NETCONF message 1002 that can be sent by the ODL component 206 to the ONA 110 in order to set the "switch-cert" and "cacert" elements of the YANG model shown in the tree 800 of FIG. 8. The example message 1002 has an entry for both the cacert and the switch-cert but these elements could be sent in separate messages as well. In an actual NETCONF message for this purpose, the body of each of the two XML data elements would contain the respective credentials. The "switch-cert" is the signed public key of the ONA 110 that was returned by the ODL component 206 in step 640 of FIG. 6. The "cacert" is the public key of the SDN controller 104 (i.e., the CA) and is not shown in any particular step of FIG. 6 as being returned to the ONA 110.

In response to receiving the message 1002 of FIG. 10, the ONA 110 can send, for example, an "OK" message 1102 as shown in FIG. 11 or an error message 1202 as shown in FIG. 12.

Figure 13:
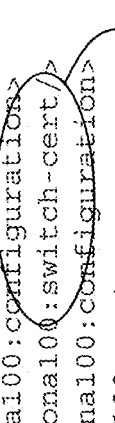

FIG. 13 illustrates an example NETCONF message that can be sent by the ODL component 206 to the ONA 110 to request the ONA 110 to provide its "switch-cert". In reply, the ONA 110 can generate the message 1402 as shown in FIG. 14.

FIG. 7 illustrates a protocol diagram of a third stage of attaching the ONA 110 to the SDN controller in accordance with the principles of the present disclosure. In accordance with the process depicted in FIG. 7, a dual-factor authentication is performed using a) a uniquely generated client certificate which was tied to only one particular ONA as first factor and b) a uniquely provisioned serial number as second factor. Once the processes depicted in FIG. 4 and FIG. 6 are completed, the ONA 110 is in a state where:

a) the ONA was physically verified by the customer during the onboarding process, b) the ONA serial number was programmed by the customer in to the SDN Controller, and c) a unique ONA client certificate was signed by SDN Controller and provisioned back to the ONA.

Now, when the ONA 110 initiates the Openflow Handshake over TLS, during TLS key negotiation time, the ONA 110 presents the client certificate which was signed by SDN Controller 104. The ODL component 206 of the SDN controller 104 verifies the client certificate using the stored CA certificate. On success of verification, the SDN Controller's ODL component 206 completes the TLS key negotiation and all traffic from the ONA 110 will be encrypted with the negotiated key. On success of the OpenFlow Handshake and NETCONF-over-SSH, the ONA 110 is mounted to the ODL component 206 of the SDN controller 104. Then the ONA Attach Notification will be delivered to the SDN Engines 210 by the ODL component 206. Afterwards, the SDN Engines 210 will use the serial number of the ONA 110, which was delivered as part of the Attach Notification, to authenticate the ONA 110.

In the above-described process, the ONA 110 can use its certificate for three purposes: a) OpenFlow-over-TLS, b) NETCONF-over-SSH and c) Web UI in manufacturing mode. However, the role of the ONA 110 during the respective key negotiations is different among those cases:

| USE CASE | ROLE |
| --- | --- |
| OpenFlow-over-TLS | Client |
| Netconf-over-SSH | Server |
| WebUI | Client |

Figure 7A:
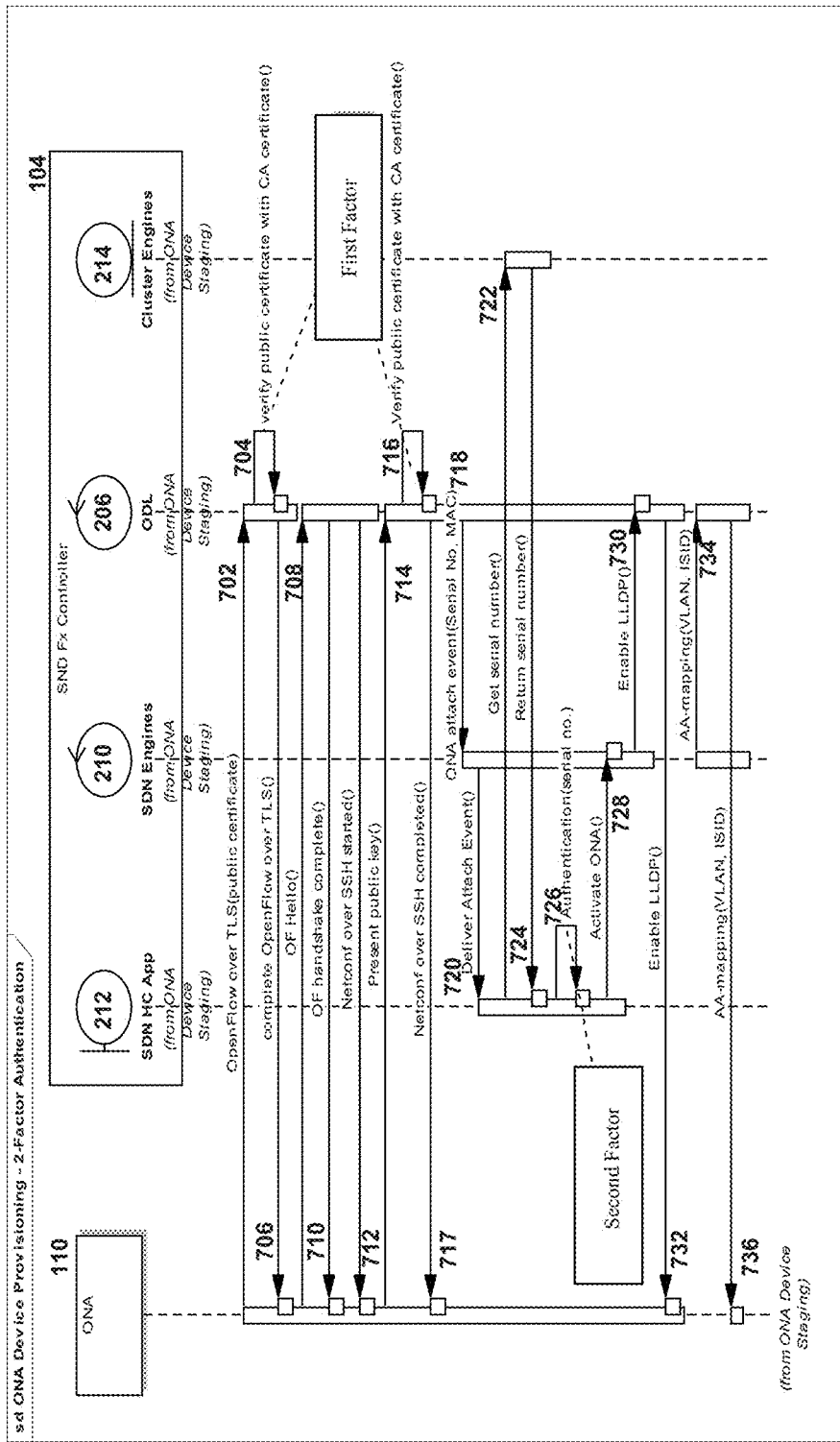
FIG. 7A illustrates a protocol diagram of a third stage of attaching the device to the SDN controller in accordance with the principles of the present disclosure.

According to the process of FIG. 7A, the ONA 110 initiates the OpenFlow over TLS handshake, in step 702, by sending its "switch-cert" certificate which the ODL component 206 can verify, in step 704, using the CA certificate it received in step 636 of FIG. 6. Upon successful certificate verification, the ODL component 206, in step 706, completes the OpenFlow initiation which causes the ONA 110 to send an OpenFlow Hello message, in step 709. The ODL component 206 then completes the OpenFlow handshake in step 710. The ODL component 206 then starts a NETCONF-over-SSH session (or tunnel), in step 712, which causes the ONA 110 to send its "switch-cert" certificate again, in step 714 so that it can be verified in step 716. Upon successful certificate verification, the ODL component completes the NETCONF negotiation process, in step 717.

Successful certificate verification also causes the ODL component to issue, in step 718, an ONA attach event to the SDN engines 210 which includes a serial number and MAC address of the ONA 110. The SDN engines 210 delivers the attach event to the management application 212, in step 720 which then requests, in step 722, serial number information from the cluster engines 214. The cluster engines 214 return the requested serial number information, in step 724, and the management application 212 can then verify, or authenticate in step 726, the serial number within the attach request. Upon successful verification, the management activates, in step 728, the ONA within the SDN engines 210 which then, in step 730, instructs the ODL component 206 to enable LLDP for the ONA 110. Once the ODL component enables LLDP for the ONA 110, in step 732, the SDN engines 210 assigns VLAN and I-SID values to the ONA 110 according to steps 734 and 736.

Figure 7B:
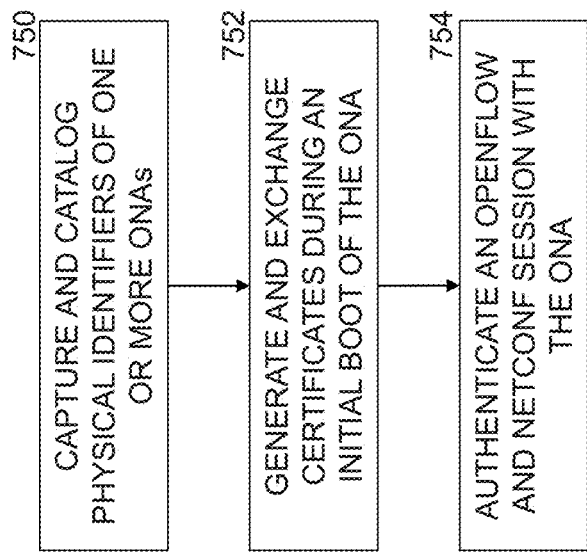
FIG. 7B illustrates a three-step workflow for onboarding a network device in accordance with the principles of the present disclosure.

FIG. 7B illustrates a three-step workflow for onboarding a network device in accordance with the principles of the present disclosure. The flowchart of FIG. 7B looks at the process described herein at the system-wide level as involving a general three-step workflow of how to on-board a new ONA onto the network by actions performed by a customer and not relying on installing PKI certificates on each ONA during the manufacturing process. The first step, step 750, involves a physical step in which the MAC address and serial number of the ONA are captured, for example, by a QR reader and added to the databases maintained by the SDN controller. Step 752, a second step, relates to a PKI generation and certificate exchange during the initial boot of the ONA when it has first been attached to the network. The public and private keys for the ONA are generated in such a way that each ONA will have a unique private key. As the initial boot process continues, the ONA and the SDN controller exchange messages using an augmented version of NETCONF to provide the ONA public key to the SDN controller. The SDN controller acts as a certificate authority, signs the public key and returns the signed certificate to the ONA. As the final step in the three-step process, the ONA can, in step 754, first authenticate an OpenFlow session and a NETCONF session using the signed certificate. Upon successful authentication using the signed certificate, the ONA can be authenticated by the OpenDaylight component using the ONA's serial number. At this stage, the ONA can be set as active and that status reflected in a management application used by the customer.

FIG. 8 illustrates an example YANG tree of a network adapter in accordance with the principles of the present disclosure.

FIG. 9-FIG. 14 illustrate examples of NETCONF messages that facilitate an exchange of public key infrastructure (PKI) certificates in accordance with the principles of the present disclosure.

Computer Technology

Figure 15:
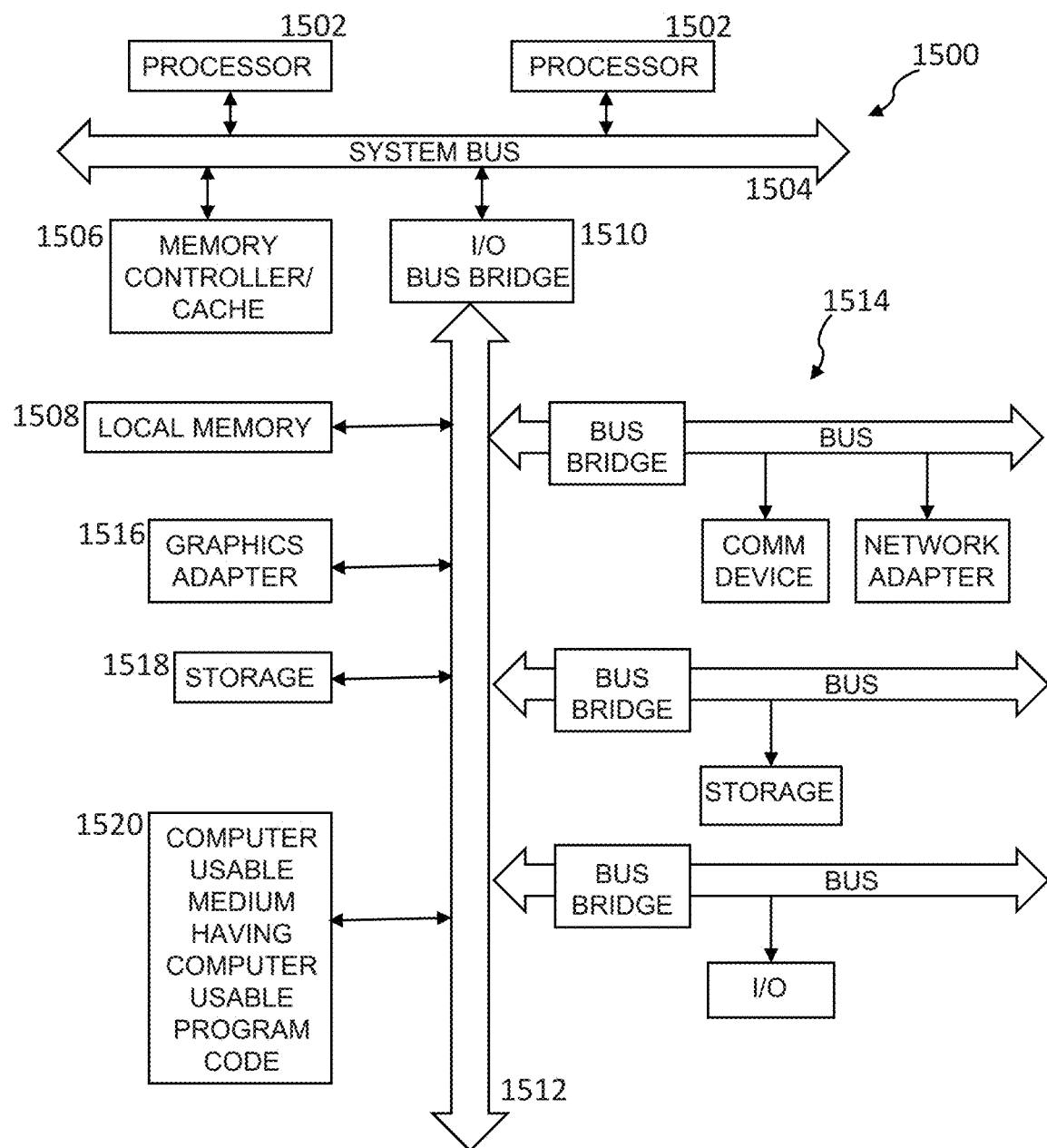
FIG. 15 illustrates an example computer platform that can host either of the SDN controller or the network adapter in accordance with the principles of the present disclosure.

Referring to FIG. 15, a block diagram of a data processing system is depicted in accordance with the present disclosure. A data processing system 1500, such as may be utilized to implement the methods, the algorithms, the computers or aspects thereof, e.g., as set out in greater detail in FIG. 1-FIG. 14, may comprise a symmetric multiprocessor (SMP) system or other configuration including a plurality of processors 1502 connected to system bus 1504. Alternatively, a single processor 1502 may be employed. Also connected to system bus 1504 is memory controller/cache 1506, which provides an interface to local memory 1508. An I/O bridge 1510 is connected to the system bus 1504 and provides an interface to an I/O bus 1512. The I/O bus may be utilized to support one or more busses and corresponding devices 1514, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 1516, storage 1518 and a computer usable storage medium 1520 having computer usable program code embodied thereon. The computer usable program code may be executed to execute any aspect of the present disclosure, for example, to implement aspect of any of the methods, computer program products and/or system components illustrated in FIG. 1-FIG. 14.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

While the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a switch, server, and/or adjunct, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

For example in one alternative embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

CONCLUSION

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the present disclosure to the precise form disclosed. Modifications and variations are possible in light of the above teachings or may be acquired from practice of the present disclosure.

The invention claimed is:

1. A computer implemented method for authenticating a networking appliance attempting to attach to a network, comprising:
   receiving, by a computer attached to the network, at least one value associated with an identity of the networking appliance;
   sending, by the computer, to the networking appliance an instruction to generate a certificate signing request (CSR), wherein the instruction is encapsulated in a first NETCONF message;
   receiving, by the computer, the certificate signing request (CSR) from the networking appliance,
      wherein the CSR comprises credential data associated with the identity of the networking appliance and the CSR is encapsulated in a second NETCONF message;
   generating, by the computer, an appliance certificate based on the credential data and a certificate authority (CA) certificate associated with the computer;
   returning, by the computer, the appliance certificate to the networking appliance;
   receiving, by the computer, a request from the networking appliance to attach to the network; and
   authenticating, by the computer, the identity of the networking appliance based on both
      a) the at least one value associated with the identity of the networking appliance; and
      b) the appliance certificate.

2. The method of claim 1, wherein the at least one value comprises a MAC address associated with the networking appliance and a serial number associated with the networking appliance.

3. The method of claim 1, wherein the credential data comprises identity data encrypted using a private key associated with the networking appliance.

4. The method of claim 3, wherein the credential data comprises a public key associated with the private key.

5. The method of claim 1, comprising:
   attaching, by the computer, the networking appliance to the network when the identity of the networking appliance is authenticated.

6. The method of claim 1, wherein returning the appliance certificate comprises generating a second NETCONF message encapsulating the appliance certificate.

7. The method of claim 1, wherein the networking appliance comprises a virtual switch.

8. The method of claim 7, wherein the networking appliance comprises a first physical interface coupled with the network and a second physical interface coupled with a network-enabled device.

9. A system for authenticating a networking appliance attempting to attach to a network, comprising:
   a memory device storing executable instructions; and
   a processor in communication with the memory device, wherein executing the executable instructions by the processor causes the processor to:
      receive at least one value associated with an identity of the networking appliance;
      send to the networking appliance an instruction to generate a certificate signing request (CSR)), wherein the instruction is encapsulated in a first NETCONF message;
      receive the certificate signing request (CSR) from the networking appliance,
         wherein the CSR comprises credential data associated with the identity of the networking appliance and the CSR is encapsulated in a second NETCONF message;
      generate an appliance certificate based on the credential data and a certificate authority (CA) certificate associated with the computer;
      return the appliance certificate to the networking appliance;
      receive a request from the networking appliance to attach to the network; and
      authenticate the identity of the networking appliance based on both:
         a) the at least one value associated with the identity of the networking appliance; and
         b) the appliance certificate.

10. The system of claim 9, wherein the at least one value comprises a MAC address associated with the networking appliance and a serial number associated with the networking appliance.

11. The system of claim 9, wherein the credential data comprises identity data encrypted using a private key associated with the networking appliance.

12. The system of claim 11, wherein the credential data comprises a public key associated with the private key.

13. The system of claim 9, wherein executing the executable instructions by the processor causes the processor to:
   attach the networking appliance to the network when the identity of the networking appliance is authenticated.

14. The system of claim 9, wherein returning the appliance certificate comprises generating a second NETCONF message encapsulating the appliance certificate.

15. The system of claim 9, wherein the networking appliance comprises a virtual switch.

16. The system of claim 15, wherein the networking appliance comprises a first physical interface coupled with the network and a second physical interface coupled with a network-enabled device.

* * * * *